United States Patent Office 2,907,795
Patented Oct. 6, 1959

2,907,795

CO-TELOMERS AND PROCESS FOR MAKING THEM

Nikolaus E. Wolff, Hockessin, Del., assignor to E. I. du Pont de Nemours and Company, Wilmington, Del., a corporation of Delaware No Drawing. Application August 2, 1956
Serial No. 601,616

10 Claims. (Cl. 260—614)

This invention relates to new fluorine-containing co-telomers and to a process for making them from a dialkyl ether telogen and a mixture of at least two different polyfluoro-monoolefins, and particularly to liquid co-telomers that have unusual properties which render them especially valuable for use as hydraulic fluids and as lubricants over a wide range of temperatures.

A serious problem facing lubrication engineers is to obtain materials which not only have good lubricity and can take high loads, but which show hydrolytic, thermal and oxidative stability. It is known that completely fluorinated hydrocarbons are exceedingly stable and that some of them have lubricating properties. However, they also have properties which have seriously limited their utility. It has been proposed to prepare lubricants by complete fluorination of hydrocarbon oils. This is illustrated by the article by Struve et al. in Ind. and Eng. Chemistry, vol. 39, No. 3 (March 1947), pages 352–354, wherein the product is shown to have a very low viscosity index of −674, a very high viscosity of 536 centistokes at 100° F., the consistency of molasses when cold, and to contain solid fluorocarbons at temperatures below 50° C.

It has also been proposed to produce high fluorine-containing products by the polymerization of fluorine-containing olefins. In general, such polymers are solids. However, it has been found that if certain fluoro-olefins are polymerized in the presence of certain saturated compounds, called telogens, such compounds will react with end carbons of the polymer chains before they have reached their maximum length to terminate such chains and form compounds known as telomers. In many cases, the telomers are solids. However, in some cases, liquid telomers are produced which have been disclosed to have lubricating properties and to be useful as lubricants. Representative telomers, their preparation and their properties are disclosed by Miller et al. in Ind. and Eng. Chem., vol. 39, No. 3 (March 1947), pages 333 to 337. Such telomers contain unsaturation and loosely held chlorine and other groups, whereby they are unstable and require an after-fluorination treatment to stabilize them. The stabilized telomers contain chlorine which decreases their stability at high temperatures and is reactive with many metals, particularly copper, whereby they are corrosive at high temperatures. Also, such telomers have quite low viscosity indices and are liquid over a limited temperature range. In addition, telomers have been prepared from tetrafluoroethylene and hydrocarbon telogens, including isobutane. Such telomers are greasy waxes or relatively low boiling liquids having a limited liquid range.

Also, co-telomers have been prepared from mixtures of chlorotrifluoroethylene and tetrafluoroethylene employing chloroform or carbon tetrachloride as the telogen. Such co-telomers also require an after-fluorination to stabilize them. They are semi-solid at ordinary room temperatures and contain chlorine.

It is an object of this invention to provide novel, fluorine-containing cotelomers, particularly such co-telomers which are liquid over a more extended range of temperatures, especially at very low temperatures, and which are stable and non-corrosive at high temperatures in the presence of water, oxygen and copper. A particular object is to provide co-telomers of such character which are high boiling liquids that have good lubricating properties at high loads as well as at low loads and which are specially useful as lubricants at extreme ranges of temperature. Another object is to provide a simple one-step process for preparing such co-telomers from low cost, readily available materials. Other objects are to provide new compositions of matter and to advance the art. Still other objects will appear hereinafter.

The above and other objects may be accomplished in accord with this invention which comprises co-telomers containing between 23% and 70% by weight of fluorine each of which consists of (1) a radical of a dialkyl ether in which each alkyl group contains 1–10 carbon atoms, including, when the alkyl group contains 4–10 carbon atoms, a valence on a carbon atom which is otherwise singly bonded to elements other than hydrogen, and (2) a polymer chain satisfying the valence of the ether radical, said polymer chain being terminated at its free end by a hydrogen atom and otherwise consisting of at least two different polyfluoro units of the structure

wherein R is a member of the group consisting of fluorine, lower perfluoroalkyl and lower omega-hydroperfluoroalkyl groups and each X is a member of the group consisting of fluorine and hydrogen; and to the process for preparing such co-telomers and other valuable products which comprises reacting, in the presence of a free radical catalyst, a telogen which is a dialkyl ether in which each alkyl radical contains 1–10 carbon atoms and, when an alkyl group contains more than 3 carbon atoms, a single hydrogen atom on at least one carbon atom, with a mixture of at least 2 different polyfluoro-monoolefins of the formula

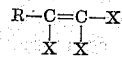

wherein R is a member of the group consisting of fluorine, lower perfluoroalkyl and lower omega-hydroperfluoroalkyl groups and each X is a member of the group consisting of fluorine and hydrogen, said mixture containing at least 29 mole percent of one polyfluoro-monoolefin and at least 29 mole percent of a different polyfluoro-monoolefin.

The process of this invention is simple and straight forward. The usual procedure involves placing the desired amounts of the ether telogen, of the mixture of polyfluoro-monoolefins and of the free radical catalyst into a pressure reaction vessel and then closing the reaction vessel and heating to the desired reaction temperature while mechanically agitating the reaction vessel for several hours. The temperature at which the reaction is effected may be varied over a wide range depending primarily upon the nature of the reactants, the catalyst, and the other conditions of the reaction, in the manner known to the art in the preparation of telomers. Normally, the temperature will be in the range of from about 75° C. to about 200° C., preferably about 110 C. Temperatures as low as about 0° C. may be employed with a catalyst, such as trichloroacetyl peroxide and trifluoroacetyl peroxide, which readily yield free radicals at such low temperatures. Temperatures materially above 200° C. contribute nothing to the reaction rate. For any particular charge, it is desirable to operate at a temperature below the pyrolysis temperature of the telogen and of the polyfluoro-monoolefins.

The products of the reaction vary from liquids to waxes, depending upon the ether telogen and the number and kind of polyfluoro-monoolefins employed. The liquid products are separated from the waxes by simple fractional distillation and, if desired, into definite fractions of limited boiling ranges.

The olefins, employed in this invention, are the polyfluoro-monoolefins of the formula

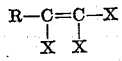

wherein R is a member of the group consisting of fluorine, lower perfluoroalkyl and lower omega-hydroperfluoroalkyl groups and each X is a member of the group consisting of fluorine and hydrogen. A "polyfluoro-monoolefin" is used in its strict sense to mean an olefin which contains at least 2 fluorine atoms and only one unsaturated bond that is an ethylenically unsaturated bond. Polyolefins, such as diolefins, tend to produce unsaturated products. All of the fluorine atoms may be in R. However, when R is fluorine, at least one X must also be fluorine. A "perfluoroalkyl" group is an alkyl group in which all hydrogen atoms have been replaced by fluorine, i.e. it consists of carbon and fluorine. An "omega-hydroperfluoroalkyl" group is an alkyl group in which all hydrogen atoms, except a single hydrogen atom on the terminal carbon atom furthest removed from the double bond, have been replaced by fluorine. The term "lower," as applied to the aforesaid groups, means groups which contain at least 1 but not more than 4 carbon atoms. Representative polyfluoro-monoolefins, which are useful in this invention, include tetrafluoroethylene, hexafluoropropene, vinylidene fluoride, trifluoroethylene, 3,3,3 - trifluoropropene-1, perfluorobutene-1, perfluoropentene - 1, perfluorohexene-1, omega - hydroperfluorohexene-1, 1,3,3,3-tetrafluoropropene-1, 2,3,3,3-tetrafluoropropene-1, 1,1,3,3,3-pentafluoropropene-1, 1,2,3,3,3-pentafluoropropene-1, 3,3-difluoropropene-1, and the like.

In order to obtain the advantageous results and the valuable co-telomers of this invention, it is essential to use a mixture of at least two different polyfluoromonoolefins of the specified structure in the process. Such mixture should contain at least 29 mole percent of one polyfluoro-monoolefin and at least 29 mole percent of a different polyfluoro-monoolefin, the rest of the mixture (42 mole percent) being composed of either or both of those two polyfluoro-monoolefins or, in whole or in part, of one or more other polyfluoro-monoolefins of the structure hereinbefore specified. The mixture may be composed wholly of polyfluoro-monoolefins in which each X is fluorine, i.e. perfluoro-monoolefins and omega-hydroperfluoro-monoolefins. However, it is much preferred that the mixture include at least one polyfluoro-monoolefin in which at least one X is hydrogen in a proportion of at least 29 mole percent of the mixture. It has been found that, in the latter case, there is obtained significantly higher yields of high-boiling liquid co-telomers and that such high-boiling liquids have lower pour points and a more extended liquid range, than when the mixture is composed wholly of polyfluoro-monoolefins in which each X is fluorine. It is further preferred that the mixture contain at least 39 mole percent of a polyfluoro-monoolefin in which at least two X are fluorine, especially one in which each X is fluorine, and at least 29 mole percent of a different polyfluoro-monoolefin in which at least one X is hydrogen, especially one in which two X are hydrogen.

The mixture of polyfluoro-monoolefins may consist of only two members of the class. Generally, such mixture will contain from about 29 to about 71 mole percent of one of the polyfluoro-monoolefins and from about 71 to about 29 mole percent of the other, preferably about 39 to about 71 mole percent of one and about 61 to about 29 mole percent of the other. Usually, the two polyfluoro-monoolefins will be employed in about equimolecular proportion. High yields of entirely satisfactory liquid co-telomers are obtained with such mixtures. However, it has been found that higher maximum yields of the higher-boiling liquid co-telomers are obtained when one or more additional polyfluoro-monoolefins, particularly those in which at least one X is hydrogen, are included in the mixture, i.e. when the mixture contains at least 3 different polyfluoro-monoolefins, preferably when at least 2 of them are polyfluoro-monoolefins in which at least one X is hydrogen. Relatively small proportions of the additional polyfluoro-monoolefins produce large effects. For example, the proportion of high-boiling liquid co-telomer in the reaction product is greatly increased by the inclusion of about 0.1 mole of a third polyfluoro-monoolefin in a mixture of 0.5 mole of each of two other different polyfluoro-monoolefins.

The ether telogens, to be employed in this invention, are the dialkyl ethers in which each alkyl radical contains 1–10 carbon atoms and, when the alkyl group contains more than 3 carbon atoms, a single hydrogen atom on at least one carbon atom, preferably when the alkyl group contains more than 2 carbon atoms. In other words, when an alkyl group contains more than 3 carbon atoms, at least 1 of the carbon atoms must bear a single hydrogen atom, that carbon atom being otherwise bonded to 3 carbon atoms (i.e. a tertiary carbon atom as in di-isobutyl ether) or to 2 carbon atoms and the ethereal oxygen atom as in di-secondary-butyl ether (equivalent to a tertiary carbon atom). When the alkyl group contains more than 6 carbon atoms at least 2 of them, preferably 3 of them, should bear a single hydrogen atom. On the other hand, when the alkyl radical contains 1–3 carbon atoms, it is not necessary that any carbon atom thereof bear a single hydrogen atom. However, a carbon atom bearing a single hydrogen atom is preferably present also when the alkyl group contains 3 carbon atoms, as in the isopropyl radical, for ease of reaction and significantly increased yields of desired products. The preferred telogens are the dialkyl ethers in which each alkyl radical contains 3–6 carbon atoms at least one of which bears a single hydrogen atom. Representative dialkyl ethers which are useful as telogens in this invention are di-methyl ether, di-ethyl ether, methyl ethyl ether, di-n-propyl ether, di-isopropyl ether, methyl-n-propyl ether, methyl isopropyl ether, ethyl isopropyl ether, di-isobutyl ether, di-secondary-butyl ether, n-propyl isopropyl ether, ethyl isobutyl ether, methyl secondary-butyl ether, di-isoamyl ether, bis(1,2-dimethyl-propyl) ether, di-isohexyl ether, isopropyl isohexyl ether, ethyl isohexyl ether, bis(diisopropylmethyl) ether, bis(triisopropylmethyl) ether, and the like. Di-isopropyl ether is most preferred.

It appears that, in the course of the reaction, the polyfluoro-monoolefins copolymerize to form polymer chains composed of 2 or more different polyfluoro units and that such polymer chains react with the telogen. Thus, the polymer chains contain at least 2 polyfluoro units and may contain a total of up to about 25 polyfluoro units, including one or more of each of the different polyfluoro units. The polymer chain replaces a hydrogen atom of the telogen and becomes terminated at its free end by a hydrogen atom. Usually, only one hydrogen atom of the telogen is replaced by one such polymer chain. In some cases, a small proportion (usually less than 1% by weight) of the product may have two or more hydrogen atoms of the telogen replaced by polymer chains. Single hydrogen atoms (on tertiary carbon atoms or their equivalents) are most easily replaced and hence, when an alkyl group contains a single hydrogen atom, that hydrogen atom is preferentially replaced by the polymer chain. When an alkyl group contains more than 1 replaceable hydrogen atom, one of these hydrogen atoms is replaced by a polymer chain composed of two or more different polyfluoro units, and one or more other hydrogen atoms may be replaced by polymer chains composed of one or more like polyfluoro units.

Thus, the various co-telomers of this invention conveniently may be defined generically as consisting of (1) a radical of a dialkyl ether in which each alkyl group contains 1–10 carbon atoms, including, when the alkyl group contains 4–10 carbon atoms, a valence on a carbon atom which is otherwise singly bonded to elements other than hydrogen, and (2) a polymer chain satisfying the valence of the ether radical, said polymer chain being terminated at its free end by a hydrogen atom and otherwise consisting of at least two different polyfluoro units of the structure

wherein R is a member of the group consisting of fluorine, lower perfluoroalkyl and lower omega-hydroperfluoroalkyl groups and each X is a member of the group consisting of fluorine and hydrogen, said polymer chain preferably including at least 1 polyfluoro unit in which at least one X is hydrogen. It is particularly desirable that the polymer chain consists essentially of at least 1 polyfluoro unit in which each X is fluorine and at least 1 polyfluoro unit in which at least one X is hydrogen.

At times, there is obtained a small amount of low boiling telomers of the individual polyfluoro-monoolefins. However, the great majority of the products are co-telomers of this invention which contain between 23% and 70% by weight of fluorine and a single polymer chain which contains at least 2 different polyfluoro units. The co-telomers show no unsaturation when tested with permanganate and are stable at high temperatures, hence do not require any after-fluorination to stabilize them. The liquid co-telomers, particularly the high-boiling liquids, are especially valuable and are obtained in high yields whereas the yields of the less valuable waxes are low. The liquid co-telomers have utility as non-flammable, non-corrosive hydraulic fluids, as snuffer agents for flammable solvents, and as lubricants. They are thermally and chemically stable and have an unusually extended liquid range, i.e. have low pour points and high boiling points and are free of solid polymeric products, whereby they are useful at extremes of temperature at which other hydraulic fluids and lubricants lose their utility. As lubricants, they have good lubricity and can take unexpectedly high loads, and have higher viscosity indices than prior highly fluorinated lubricants. The waxes are useful as lubricants, mold release agents, as protective coatings for various surfaces, and as impregnants for paper and textile materials to render them water and oil repellant.

The preferred co-telomers of this invention are the normally liquid co-telomers which contain from about 60% to about 61% by weight of fluorine, boil in the range of from about 200° C. to about 310° C., and consist of of the monovalent radical of di-isopropyl ether in which the valence belongs to one of the carbon atoms which is bonded to oxygen and a polymer chain satisfying the valence of the monovalent radical, said polymer chain being terminated at its free end by a hydrogen atom and otherwise consisting essentially of at least one unit of the structure —CF$_2$—CF$_2$— and at least one unit of the structure —CF$_2$—CH$_2$—. Such co-telomers are the products of the reaction of di-isopropyl ether, as a telogen, with a mixture of polyfluoro-monoolefins which mixture consists essentially of about equi-molecular proportions of tetrafluoro-ethylene and vinylidene fluoride, including such mixture of polyfluoro-monoolefins containing about 0.1 mole of 3,3,3-trifluoro-propene-1. The preparation of such co-telomers is illustrated by Examples 3 and 4 given hereinafter.

The ratio of telogen to the mixture of polyfluoro-monoolefins may vary considerably, and the range thereof corresponds to the known range of ratios of telogen to polyfluoro-olefins conventionally employed in the preparation of telomers of the prior art. Generally, the telogen can vary from at least about 0.1 mole up to about 20 moles for each mole of the mixture of polyfluoro-monoolefins, preferably from about 1.5 to about 5 moles of telogen for each mole of polyfluoro-monoolefins to give high yields of high boiling liquids and little or no low boiling products. Excess telogen serves as a solvent for the reactants and, in general, is not objectionable so long as it does not result in too high dilution of the reactants or unduly increase the costs of the subsequent steps of separating and recovering the ingredients of the reaction mixture.

The catalyst should be a free radical catalyst, i.e. a compound which readily yields free radicals. Such catalysts are well known, particularly for the preparation of telomers of polyfluoro-olefins. The catalysts include peroxygen compounds, such as ditertiary butyl peroxide, diacyl peroxide, benzoyl peroxide, ethyl peroxide, sodium peroxide, hydrogen peroxide, oxygen, ozone, and ammonium persulfate. Also, included are tertiary butyl hydroperoxide, peracetic acid, diacetyl peroxide, trichloroacetyl peroxide, trifluoroacetyl peroxide, and the like. The preferred catalyst is ditertiary butyl peroxide. The selection of the catalyst will influence somewhat the temperature at which the reaction will be carried out, since a temperature should be used which will insure the efficient generation of free radicals and a half-life to the catalyst of about four hours. The amount of the catalyst employed will correspond with that which is known to be useful in the preparation of telomers of polyfluoroolefins, and in accord with the known principles in connection therewith. Generally, the catalyst may be from about 0.1% to about 10% by weight based on the weight of the telogen, preferably from about 0.8% to about 10%. The lower ratios of catalyst, below about 5, give lower conversions but higher proportions of the higher boiling liquids in the products, whereas the higher ratios of catalyst, 5% and above, give higher conversions but lower proportions of the higher boiling liquids.

The reaction may be carried out at atmospheric pressures or at super-atmospheric pressures. Usually, autogenous pressures will be used, generally of the order of 100 to 1,000 pounds per square inch gauge. Externally induced pressures up to about 10,000 pounds per square inch gauge can be used, but generally without significant improvement.

In order to more clearly illustrate this invention, preferred modes of practicing it, and advantageous results to be obtained thereby, the following examples are given, wherein the parts are by weight except where otherwise specifically indicated:

EXAMPLE 1

A stainless steel agitated reaction vessel is charged with 100 parts (2.17 moles) of dimethylether, 50 parts (0.5 mole) of tetrafluoroethylene, 38 parts (0.5 mole) of vinylidene fluoride, and 6 parts (0.04 mole) of ditertiary butyl-peroxide catalyst. The reaction vessel is then closed, heated to 110° C. and held at 110° C. for 2.5 hours during which time the pressure drops from about 850 p.s.i.g. to about 475 p.s.i.g. After cooling and opening the reaction vessel, 89 parts of an opaque white liquid is obtained which on distillation yields the following fractions:

|   | Percent of Total | Boiling Range |
|---|---|---|
| A | 34.2 | 35–145° C. |
| B | 23.2 | 145–300° C. |
| C | 42.6 | Greasy Wax. |

Fractions A and B are liquid and compose 57.4% of the total.

The above fractions are redistilled to give cuts having the following analysis:

| Cut | Boiling Range | Percent C | Percent H | Percent F | Pour Point |
|---|---|---|---|---|---|
| #1 | 65–80° C | 48.5 | 7.5 | 30.7 | Crystallizes at −65° C. |
| #2 | 85–95° C | 53.3 | 8.5 | 23.8 | Crystallizes at −45° C. |
| #3 | 150–170° C | 32.1 | 3.1 | 56.9 | −65° C. |
| #4 | 280–300° C | 32.0 | 2.6 | 62.8 | −25° C. |
| #5 | Greasy Wax | 30.4 | 1.8 | 65.6 | |

The analysis of cut #3 indicates that this product contains 1 to 3 tetrafluoroethylene units and 5 vinylidene fluoride units per molecule.

When the above experiment is repeated but the reaction allowed to proceed for 12 hours at 75° C. and at 150° C. for 1 hour, essentially the same results are obtained.

The crude product may be purified if desired. It is often advantageous to wash it with concentrated nitric acid followed by a wash with concentrated sulfuric acid or a mixture of these acids. The use of these acids either cold or warm will assist in removing fragments of catalyst that may remain. As indicated, the product can be distilled and fractionated at atmospheric or reduced pressures. Often, it is desirable to filter the liquids through alumina to remove some color residue which often persists from catalyst fragments.

On refluxing the liquids of cuts #2 and #3 above for 100 hours in copper flasks and in contact with air, there is no corrosion of the copper, no detectable acidity in the liquid and only very slight discoloration. When cut #4 is held at 250° C. under the same condition, no corrosion, acidity or significant discoloration is observed.

EXAMPLE 2

Following the general procedure and conditions of Example 1, 150 parts (3.25 moles) of dimethyl ether, 20 parts (0.208 mole) of 3,3,3-trifluoropropene-1, 50 parts (0.5 mole) of tetrafluoroethylene and 6 parts of ditertiary butyl peroxide are reacted for 6 hours at 110° C. In this way, 82 parts of liquid product are obtained which on distillation yields:

A. 56.2% boiling at 62–190° C.
B. 27.4% boiling at 190–260° C.
C. 12.3% boiling at 260–310° C.
D. 4.1% greasy wax Fractions A, B and C or 96% of the total are liquid products.

Redistillation of the above fractions yields the following cuts:

| Cut | Boiling Range, °C. | Percent C | Percent H | Percent F | Pour Point, °C. |
|---|---|---|---|---|---|
| #1 | 70–80 | 39.7 | 5.3 | 38.9 | −45 |
| #2 | 100–110 | 33.2 | 3.9 | 56.7 | −65 |
| #3 | 150–170 | 31.3 | 2.8 | 59.8 | −75 |
| #4 | 282–310 | 30.6 | 2.3 | 61.5 | −40 |

On heating these liquids in copper flasks for 100 hours in the presence of air and at 250° C. (or at reflux), no significant change occurs.

EXAMPLE 3

Following the general procedure of Example 1, 180 parts (1.76 moles) of diisopropyl ether, 50 parts (0.5 mole) of tetrafluoroethylene, 38 parts (0.5 mole) of vinylidene fluoride and 6 parts of ditertiary butyl peroxide are heated at 110° C. The initial pressure of 700 p.s.i.g. is increased to about 8000 p.s.i.g. by pressuring with nitrogen. After 3 hours, the reaction vessel is cooled, and the product, 249 parts of colorless liquid, is removed and distilled to yield the following fractions:

A. 65.7% boiling at 200–310° C.
B. 34.3% greasy wax

A cut, having a boiling range of 105° C./0.15 mm. Hg to 155° C./0.10 mm. Hg, was found to have an average molecular weight of 604. An elemental analysis indicated it to have the structure:

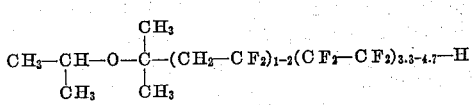

Analysis of a cut boiling at 300–310° C. shows that it contains 34.7% C, 2.8% H, and 60.1% F. It has an average molecular weight of 760 and has a pour point of −60° C.

The wax fraction contains 32.9% C, 2.6% H, and 62.2% F. A distilled wax fraction dissolves in amyl acetate to give a solution containing between 15% and 20% by weight of the wax. Such solution is readily obtained by heating under reflux for a short time.

When the liquid product was held at 250° C. for 100 hours in a copper flask and in the presence of air, no corrosion occurred.

By way of comparison, when a mixture of 100 parts of diisopropyl ether, 50 parts of tetrafluoroethylene and 2 parts of ditertiary butyl peroxide were similarly reacted at 110° C., there was obtained 33.7 parts of a liquid material which freezes at about 5° C. and has a boiling range of 60° C./8 mm. Hg to 157° C./0.9 mm. Hg. Part of this material is waxy at room temperature and boils at 120° C./1 mm. Hg (about 305° C. at atmospheric pressure). When this experiment was repeated, employing vinylidene fluoride in place of the tetrafluoroethylene, only a waxy product was obtained.

EXAMPLE 4

Following the details of Example 1, 180 parts (1.76 moles) of diisopropyl ether, 50 parts (0.5 mole) of tetrafluoroethylene, 38 parts (0.5 mole) of vinylidene fluoride, 10 parts (0.104 mole) of 3,3,3-trifluoropropene-1, and 6 parts of ditertiary butyl peroxide are reacted at 110° C. for 7 hours. The initial pressure of 650 p.s.i.g. drops to 290 p.s.i.g. during the reaction. The product of 272 parts of clear, colorless liquid is distilled to yield 82.5% of liquid boiling at 200–310° C. and 17.5% of greasy wax. A liquid cut boiling at 260–310° C. and having a pour point of −68° C. contains 36.1% C, 3.4% H and 61.2% F. This material shows no corrosion to copper after 100 hours at 250° C. and in the presence of air.

EXAMPLE 5

Following the details of Example 1, 180 parts (1.76 moles) of diisopropyl ether, 50 parts (0.5 mole) of vinylidene fluoride, 50 parts (0.33 mole) of hexafluoropropene and 6 parts of ditertiary butyl peroxide are reacted at 110° C. for 16 hours to yield 220 parts of a slightly turbid liquid. On distillation, the following fractions were obtained:

A. 32.3% boiling at 80–180° C.
B. 53.1% boiling at 200–320° C.
C. 4.6% greasy wax Analysis of a cut boiling at 260–300° C. shows that it contains 35.2% C, 3.0% H, and 61.1% F. This liquid has a pour point of −40° C. This liquid is stable to copper and air at 250° C. for over 100 hours.

EXAMPLE 6

Following the details of Example 1, 180 parts (1.76 moles) of diisopropyl ether, 50 parts (0.5 mole) of tetrafluoroethylene, 50 parts (0.33 mole) of hexafluoropropene and 6 parts of ditertiary butyl peroxide are reacted to give 240 parts of product. On distillation:

74.5% boils at 80–165° C.
21.0% boils at 165–200° C.
1.7% boils at 200–250° C.
2.8% is a greasy wax.

Analysis of a cut boiling at 200–250° C. shows that it contains 32.3% C, 2.5% H, and 63.8% F. The liquid has a pour point of −50° C. and shows no significant decomposition at 250° C. for over 100 hours in the presence of copper and air.

It is also well known that liquid telomer products, which have been proposed for use as lubricants, have been prepared from chlorotrifluoroethylene, employing chloroform or carbon tetrachloride as the telogen and then after-treating the product by fluorination with $CoF_3$ to remove unsaturation and other loosely held substituents and to stabilize the product. The properties of a representative, commerically available product (oil C) so prepared are compared in the following Table I with representative products (oils A and B) of this invention prepared by the processes of Examples 3 and 4, respectively:

Table I

| Oil | V. I. | Pour Point, °C. | Boil. Range, °C. | Therm. Stab. in Air | | Decomp. Prod. | Corrosion on Cu, 250° C. |
|---|---|---|---|---|---|---|---|
| | | | | 200° C. | 250° C. | | |
| A | −87 | −60 | 290–310 | Exc | Exc | none | none. |
| B | | −68 | 260–310 | Exc | Exc | none | none. |
| C | −181 | −15 | 250–300 | Exc | 6 hrs | white deposit. | pitting. |

It should be noted that oil C has a liquid range from −15 to 300° C. whereas oil A is liquid from −60 to 310° C. and oil B is liquid from −68° C. to 310° C. This is 55 to 63 centigrade degrees, or about 17.5% to 20% greater. All three oils are thermally stable (Exc.) in air at 200° C. and showed no color change. Furthermore, oils A and B have excellent (Exc.) thermal stability at 250° C., whereas oil C breaks down in 6 hours at this temperature. In addition, no decomposition products appear in oils A or B but oil C develops white deposits. Also of great significance is the fact that oil C causes pitting on copper at 250° C., while oils A and B show no corrosion. Furthermore, oil A has a much higher viscosity index (V.I.) than oil C.

One of the requirements of an acceptable lubricant is that it withstand the load to which it is subjected under use. That is, the lubricating film which separates the moving bearing surfaces must not be broken. The greater the load on the bearing surfaces the greater must be the film strength of the lubricant.

The lubricants of this invention have exceptionally good film strength under high loads as shown by the Almen film strength test. This test consists of rotating a steel cylindrical rod in a steel split bushing while the entire assembly is immersed in the test oil. Two-pound weights are added at ten second intervals as the rod rotates at 2000 r.p.m. The highest bearing load at which seizure occurs is recorded. A lubricant film which can withstand a bearing load exceeding about 10,000 p.s.i. is considered to be very good. The data in the following Table II indicate the excellent film strength of the lubricants of this invention in which a representative co-telomer (A), fraction A of Example 3, having a boiling range of 200–310° C., is compared to well-known liquid lubricants:

Table II

| Lubricant | Almen Film Strength 2,000 r.p.m.—Sliding speed 39 ft./min. |
|---|---|
| | P.s.i. |
| Co-telomer A | 15,000 |
| Mineral lubricating oil | 6,000 |
| Di(2-ethyl hexyl sebacate) | 6,000 |
| Perfluorocarbon oil [1] | 3,000 |

[1] Obtained by fluorination of a hydrocarbon oil with cobalt trifluoride.

The low boiling liquids of this invention are useful also as hydraulic fluids under those conditions where extremely low temperatures normally cause the oil to solidify and become of little value. The liquids of this invention are also useful to increase flash points of flammable solvents (snuffer agents). Merely mixing the solvent with a small proportion, of the order of 1% by weight, of the co-telomer oil results in a significant flash point increase.

In some cases, a minor proportion of a co-telomer wax is obtained. Such wax is more soluble in amyl acetate and like organic solvents than the solid telomers of single polyfluoro-monoolefins. Thereby, the co-telomer waxes of this invention are particularly adapted to be applied, in the form of solutions in amyl acetate and like solvents, as protective coatings to surfaces and as impregnants for paper, textiles, and like materials to render them water and oil repellent.

It will be understood that Examples 1 to 6, inclusive, are given for illustrative purposes solely, and that this invention is not restricted to the specific embodiments disclosed therein. On the other hand, it will be readily apparent to those skilled in the art that, within the limits set forth in the general description, many variations and modifications can be made without departing from the spirit and scope of this invention. For example, the mixtures of polyfluoro-monoolefins may be composed of other polyfluoro-monoolefins of the class, a greater number of such polyfluoro-monoolefins, other proportions of the different polyfluoro-monoolefins to each other, and the like, with corresponding variations in the structure and the number of polyfluoro units in the polymer chains of the co-telomers. Likewise, the dialkyl ether telogens may be varied to vary, to some extent, the hydrocarbon portion of the co-telomer. Furthermore, the catalysts, the proportions thereof, the temperatures, the other conditions, the apparatus, and the techniques employed may be widely varied.

From the preceding description, it will be apparent that this invention provides a simple, one-step process for readily preparing novel, saturated polyfluoro co-telomers. Particularly, this invention provides new compositions of matter which are co-telomers which have novel, very valuable advantageous properties and utilities. Accordingly, this invention constitutes a valuable contribution to and advance in the art.

This is a continuation-in-part of my copending application Serial No. 516,309, filed June 17, 1955, now abandoned.

The embodiments of the invention in which an exclusive property or privilege is claimed are defined as follows:

1. A saturated co-telomer containing between 23% and 70% by weight of fluorine and consisting of (1) a radical of a dialkyl ether which contains at least one hydrogen atom on at least one of the carbon atoms that is bonded to the ether oxygen atom and in which each alkyl group contains 1–10 carbon atoms, including, when the alkyl group contains 4–10 carbon atoms, at least one carbon atom which is bonded to no more than one hydrogen atom, and (2) a polymer chain satisfying the valence of the ether radical, said polymer chain being terminated at the free end by a hydrogen atom and otherwise consisting of a total of about 4.0 to about 25 units of two to three different polyfluoro units of the structure

wherein R is a member of the group consisting of fluorine, lower perfluoroalkyl and lower omega-hydroperfluoroalkyl groups and each X is a member of the group consisting of fluorine and hydrogen at least one X being fluorine when R is fluorine.

2. A normally liquid saturated co-telomer containing between 23% and 70% by weight of fluorine and consisting of (1) a radical of a dialkyl ether which contains at least one hydrogen atom on at least one of the carbon atoms that is bonded to the ether oxygen atom and in which each alkyl group contains 3-6 carbon atoms and in which at least one carbon atom which is bonded to no more than one hydrogen atom, and (2) a polymer chain satisfying the valence of the ether radical, said polymer chain being terminated at the free end by a hydrogen atom and otherwise consisting of a total of about 4.0 to about 25 units of two to three different units of the structure

wherein R is a member of the group consisting of fluorine, lower perfluoroalkyl and lower omega-hydroperfluoroalkyl groups and each X is a member of the group consisting of fluorine and hydrogen at least one X being fluorine when R is fluorine, including at least 1 polyfluoro unit in which at least one X is hydrogen.

3. A normally liquid saturated co-telomer containing between 23% and 70% by weight of fluorine and consisting of (1) a radical of a dialkyl ether which contains at least one hydrogen atom on at least one of the carbon atoms that is bonded to the ether oxygen atom and in which each alkyl group contains 3-6 carbon atoms and in which at least one carbon atom which is bonded to no more than one hydrogen atom, and (2) a polymer chain satisfying the valence of the ether radical, said polymer chain being terminated at the free end by a hydrogen atom and otherwise consisting of a total of about 4.0 to about 25 units of two to three different polyfluoro units of the structure

wherein R is a member of the group consisting of fluorine, lower perfluoroalkyl and lower omega-hydroperfluoroalkyl groups and each X is a member of the group consisting of fluorine and hydrogen at least one X being fluorine when R is fluorine, said polymer chain consisting essentially of at least 1 polyfluoro unit in which each X is fluorine and at least 1 polyfluoro unit in which at least one X is hydrogen.

4. A saturated co-telomer containing between 23% and 65% by weight of fluorine and consisting of (1) the radical of di-isopropyl ether in which the valence belongs to one of the carbon atoms which is bonded to oxygen, and (2) a polymer chain satisfying the valence of the ether radical, said polymer chain being terminated at the free end by a hydrogen atom and otherwise consisting of a total of about 4.0 to about 25 units of two to three different polyfluoro units of the structure

wherein R is a member of the group consisting of fluorine, lower perfluoroalkyl and lower omega-hydroperfluoroalkyl groups and each X is a member of the group consisting of fluorine and hydrogen at least one X being fluorine when R is fluorine.

5. A normally liquid saturated co-telomer containing from about 60% to about 61% by weight of fluorine and boiling in the range of about 200° C. to about 310° C. and consisting of (1) the radical of di-isopropyl ether in which the valence belongs to one of the carbon atoms that is bonded to oxygen, and (2) a polymer chain satisfying the valence of the ether radical, said polymer chain being terminated at the free end by a hydrogen atom and otherwise consisting essentially of at least one unit of the structure —CF$_2$—CF$_2$— and at least one unit of the structure —CF$_2$—CF$_2$—.

6. The process for preparing co-telomers containing between 23% and 70% by weight of fluorine which comprises telomerizing, in the presence of a free radical telomerization catalyst, a dialkyl ether which contains at least one hydrogen atom on at least one of the carbon atoms that is bonded to the ether oxygen atom and in which each alkyl radical contains 1-10 carbon atoms, including, when the alkyl group contains 4-10 carbon atoms, at least one carbon atom bonded to no more than one hydrogen atom, with a mixture of 2 to 3 different polyfluoromonoolefins of the formula

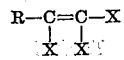

wherein R is a member of the group consisting of fluorine, lower perfluoroalkyl and lower omega-hydroperfluoroalkyl groups and each X is a member of the group consisting of fluorine and hydrogen at least one X being fluorine when R is fluorine, said mixture containing at least 29 mole percent of one polyfluoro-monoolefin and at least 29 mole percent of a different polyfluoro-monoolefin.

7. The process for preparing co-telomers containing between 23% and 70% by weight of fluorine which comprises telomerizing, in the presence of a free radical telomerization catalyst, a dialkyl ether which contains at least one hydrogen atom on at least one of the carbon atoms that is bonded to the ether oxygen atom and in which each alkyl radical contains 3-6 carbon atoms and at least one carbon atom bonded to no more than one hydrogen atom with a mixture of 2 to 3 polyfluoro-monoolefins of the formula

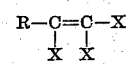

wherein R is a member of the group consisting of fluorine, lower perfluoroalkyl and lower omega-hydroperfluoroalkyl groups and each X is a member of the group consisting of fluorine and hydrogen at least one X being fluorine when R is fluorine, said mixture containing at least 29 mole percent of a polyfluoro-monoolefin in which at least two X are fluorine and at least 29 mole percent of a different polyfluoro-monoolefin in which at least one X is hydrogen.

8. The process for preparing co-telomers containing between 23% and 70% by weight of fluorine which comprises telomerizing, in the presence of a free radical telomerization catalyst, di-isopropyl ether with a mixture of 2 to 3 polyfluoro-monoolefins of the formula $$R-C=C-X$$
$$\phantom{R-}X\phantom{=}X$$

wherein R is a member of the group consisting of fluorine, lower perfluoroalkyl and lower omega-hydroperfluoroalkyl groups and each X is a member of the group consisting of fluorine and hydrogen at least one X being fluorine when R is fluorine, said mixture containing at least 29 mole percent of a polyfluoro-monoolefin in which at least two X are fluorine and at least 29 mole percent of a different polyfluoro-monoolefin in which at least one X is hydrogen.

9. The process for preparing co-telomers containing between 23% and 70% by weight of fluorine which comprises telomerizing, in the presence of a free radical telomerization catalyst, di-isopropyl ether with a mixture of 2 polyfluoro-monoolefins of the formula

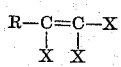

wherein R is a member of the group consisting of fluorine, lower perfluoroalkyl and lower omega-hydroperfluoroalkyl groups and each X is a member of the group consisting of fluorine and hydrogen at least one X being fluorine when R is fluorine, said mixture consisting of from about 39 to about 71 mole percent of at least one polyfluoro-monoolefin in which each X is fluorine and from about 61 to about 29 mole percent of at least one polyfluoro-monoolefin in which at least one X is hydrogen.

10. The process for preparing a normally liquid saturated co-telomer composition containing about 60% fluorine and boiling in the range of about 200° C. to about 310° C. which comprises telomerizing, in the presence of a free radical telomerization catalyst, di-isopropyl ether with a mixture of polyfluoro-monoolefins which consists essentially of about equi-molecular proportions of tetrafluoroethylene and vinylidene fluoride.

References Cited in the file of this patent

UNITED STATES PATENTS

| | | |
|---|---|---|
| 2,433,844 | Hanford | Jan. 6, 1948 |
| 2,471,959 | Hunt | May 31, 1949 |
| 2,598,283 | Miller | May 27, 1952 |
| 2,694,701 | Blum et al. | Nov. 16, 1954 |
| 2,775,618 | Dittman et al. | Dec. 25, 1956 |
| 2,856,440 | Wolff | Oct. 14, 1958 |

FOREIGN PATENTS

| | | |
|---|---|---|
| 583,874 | Great Britain | Jan. 1, 1947 |

UNITED STATES PATENT OFFICE
CERTIFICATE OF CORRECTION

Patent No. 2,907,795                                            October 6, 1959

Nikolaus E. Wolff

It is hereby certified that error appears in the printed specification of the above numbered patent requiring correction and that the said Letters Patent should read as corrected below.

Column 12, line 14, for "$-CF_2-CF_2-$" read -- $-CF_2-CH_2-$ --.

Signed and sealed this 19th day of April 1960.

(SEAL)
Attest:

KARL H. AXLINE                                        ROBERT C. WATSON
Attesting Officer                                    Commissioner of Patents